3,600,332
PLATINUM LOADED ZEOLITE
Philip John Hunter, Twickenham, Middlesex, England, assignor to The British Petroleum Company Limited, London, England
No Drawing. Filed May 22, 1968, Ser. No. 731,311
Claims priority, application Great Britain, May 26, 1967, 24,523/67
Int. Cl. B01j 11/40
U.S. Cl. 252—455Z          12 Claims

ABSTRACT OF THE DISCLOSURE

An alkane dehydrogenation catalyst is made by exchanging platinum group metal ions on to a small pore molecular sieve whose pores are at least as small as those of a 5A sieve. The exchange takes place in two or more stages each separated by a drying and reduction step.

---

This invention relates to an alkane dehydrogenation catalyst, a process for preparing it, and a dehydrogenation process using it.

Zeolites are a well-known class of alumino-silicate minerals having a molecular structure composed of a rigid network of aluminium, silicon and oxygen atoms together with inter-changeable ions which may be, for example, metal cations, hydrogen or ammonium ions. They are also characterised by having pore openings which are uniform in size in any given zeolite, but which vary in different zeolites over a range of 3–15A.

Certain molecular sieves of medium to large pore size are known in the so-called metal loaded form. It is also known that platinum group metals supported on carriers such as silica and/or alumina are useful in the aromatisation, isomerisation and cracking of alkanes.

Our copending applications Nos. 20,168/67 and 20,169/67 BP Cases C. 2,076 and C. 2,077 describe the use of platinum loaded zeolites, without and with respectively, subsequently exchanged alkali or alkaline earth metal ions, as alkane dehydrogenation catalysts.

Small pore sized sieves of 3A, 4A, and 5A type are preferred. When these are used only a small quantity of platinum may be exchanged onto the sieve even if an excess of a solution of complexed platinum ions is used. Sieves of medium to large pore size will retain a great deal more platinum. The reason is probably that the complexed platinum ion is too large to pass into the micro pores of the smaller sieves and is only exchanged onto the limited surface outside the pores.

It has now been found that if a complexed platinum ion is exchanged onto a small pore sieve, dried and reduced, more platinum may be exchanged and the cycle repeated a number of times.

According to one aspect of the present invention there is provided a catalyst comprising at least 0.3% by weight of a platinum group metal exchanged on to a molecular sieve having pore size equal to or less than that of a 5A type sieve, the exchange having taken place in at least two stages, each stage being separated by a reduction of the exchanged sieve.

Preferably the catalyst contains between 0.35%, and 1.0% of platinum.

According to another aspect of the present invention there is provided a process for the production of a catalyst, which process comprises exchanging a molecular sieve having pore size equal or less than that of a 5A type sieve with complexed platinum group metal ion, drying and reducing the exchanged sieve, and exchanging the sieve again with complexed platinum group metal ions, drying and reducing again.

The exchanging, drying and reducing cycle may repeated a number of times.

After this treatment the catalyst may be exchang with alkali or alkaline earth metal ions.

It is known that in the dehydrogenation of n-alkan to the corresponding n-alkenes the selectivity to n-alken falls as the conversion rises. The partial poisoning l alkali or alkaline earth metal ions permits either t same n-alkene selectivity at a higher conversion, or higher n-alkene selectivity at the same conversion.

Suitable molecular sieve supports are those designati types 5A, 4A and 3A. The preferred supports are 3 and 4A type sieves.

(These preferred supports give higher selectivity alkenes.)

The preferred platinum group metal is platinum itse

During the reduction of the catalyst it is believed th hydrogen ions are formed on the release of the comple ing agent and that exchange of more platinum grou metal or of alkali or alkaline earth metal can subsequer ly take place with these hydrogen ions.

A typical reaction is considered to be:

Exchange: $2Na^+ 2 \text{ Sieve}^- + Pt(NH_3)_4^{2+} = Pt(NH_3)_4^{2+} \text{ Sieve}^- + 2Na^+$ Reduction: $Pt(NH_3)_4^{2+}.2 \text{ Sieve}^- + H_2 = Pt.2H^+.2 \text{ Sieve}^- + 4NH_3$ Exchange: $Pt.2H^+.2 \text{ Sieve}^- + Pt(NH_3)_4^{2+} = Pt.Pt(NH_3)_4^{2+}.2 \text{ Sieve}^- + 2H^+$ The solution ions shown in the first exchange reactic are those normally present on the sieve. Any delibera incorporation of alkali or alkaline earth metal ions tak place after reduction and corresponds to the second e change reaction, i.e. with $2Na^+$ instead of $Pt(NH_3)_4^2$ The preferred complexing agents are amines and pa ticularly ammonia.

Preferably the sieve is moistened before it is exchange by passing air saturated with moisture over it.

Preferably each ion exchange is performed by contac ing an aqueous solution of a complexed platinum ic with the moistened sieve.

Preferably each reduction takes place by contactir the exchanged sieve with hydrogen at elevated temper; ture.

According to a third aspect of the present inventic there is provided a process for the dehydrogenation ( normal alkanes to normal alkenes which process con prises contacting the alkane at elevated temperature wit a catalyst comprising at least 0.3% by weight of platinum group metal exchanged on to a molecular sie having pore size equal to or less than a 5A type siev the exchange having taken place in at least two stag each being separated by a reduction of the exchange sieve.

Suitable normal alkanes which may be dehydrogenate include those containing from 3 to 30 carbon atoms p molecule.

Dehydrogenation is suitably effected at a temperatu in the range 400 to 650° C.

Pressure should lie between 10 mm. mercury an 1000 p.s.i.g., preferably between 0 and 50 p.s.i.g.

The alkane may be passed over the catalyst at a LHS in the range 0.1 to 20 vol./vol.

In order to suppress undesirable side reactions, deh) drogenation is preferably effected in the presence c added hydrogen. Suitably the molar ratio of added h) drogen to the alkane feedstock is in the range 0.1 to 1( The invention is illustrated by the following example

EXAMPLE 1

A 4A–XW sieve was dried at 450° C. for four hou in flowing nitrogen. The dry sieve (100 g.) after weighin carefully wetted (rapid wetting causes break-down to s) by passing air saturated with water over the ma- al. The wetted product was placed in water (250 ml.) heated at 80° C. Solid Pt(NH$_3$)$_4$Cl$_2$H$_2$O (0.905 g., ivalent to 0.5% Pt on the sieve) was added and the :ture stirred slowly at 80° C. for 8 hours. The solid filtered off, washed free of Cl$^-$ (AgNO$_3$ test) and :d in air (GHSV 2000), initially at 100° C., until the ient air contained only 300 p.p.m., of water. The perature was then slowly raised such that the effluent contained 300–500 p.p.m. of water until the tempera- reached 550° C. The Pt complex was then reduced 550° C. by displacing air with nitrogen, then passing rogen for 3 hours at GHSV 1000.

.33% wt. of platinum was retained on the sieve.

he experiment was repeated but with 3.62 g. of solid NH$_3$)$_4$Cl$_2$.H$_2$O equivalent to 2.0 percent Pt on the 'e. Again only 0.33% wt. of platinum could be ined on the sieve.

his example does not show the process of the present invention and is provided for comparison only.

EXAMPLE 2

00 g. of a platinum exchanged 4A–XW sieve prepared lescribed in Example 1 but containing only 0.26% by ght was placed in 250 ml. water and 0.905 g. of NH$_3$)$_4$Cl$_2$.H$_2$O added. The temperature was raised 30° C. and the mixture stirred for 8 h. The washing, ing and reduction procedure described in Example 1 carried out.

he catalyst contained 0.51% by weight of platinum.

EXAMPLE 3 he singly exchanged sieve of Example 2 containing 5% wt. Pt was compared with the doubly exchanged n containing 0.51% wt. for the dehydrogenation of exane in both the H$^+$ and Na$^+$ forms. The Na$^+$ form prepared in each case by placing a sample of Pt ex- nged sieve (H$^+$ form) in 200 ml. water and stirring it 4 hours with 1.7 g. NaHCO$_3$ dissolved in a little er, filtering off the solid, washing it and drying it as cribed in Example 1.

he catalysts were activated by heating for 1 h. in rogen and then n-hexane was passed over them to- ier with H$_2$. The mixture contained 10 mols H$_2$ per hexane. Both these operations were preformed at ° C. and at atmospheric pressure. After 1 h. the fol- ing results were obtained.

| lyst | Pt content, percent wt. | n-Hexane, LHSV | n-Hexane, conversion percent |
|---|---|---|---|
| ly exchanged H$^+$ form | 0.26 | 0.6 | 34.9 |
| bly exchanged H$^+$ form | 0.51 | 0.6 | 47.5 |
| ly exchanged Na$^+$ form | 0.26 | 1.2 | 22.8 |
| oly exchanged Na$^+$ form | 0.51 | 1.2 | 31.5 | t can clearly be seen that the doubly exchanged sieve s considerably greater conversion for both the nor- H$^+$ and for the Na$^+$ form. The Na$^+$ form gives ier selectivity at a given conversion.

claim:

. A platinum group metal loaded zeolite catalyst suit- able for use as an alkane dehydrogenation catalyst com- prising a molecular sieve having a pore size no greater than that of a 5A type sieve and at least 0.3% by weight of a platinum group metal exchanged onto said molecu- lar sieve, said catalyst being prepared by carrying out the exchange in at least two stages, with drying and a reduction of the exchanged sieve being carried out be- tween each stage.

2. Catalyst according to claim 1 where the catalyst contains between 0.35% and 1.0% of platinum.

3. A process for the production of a platinum group metal loaded zeolite catalyst suitable for use as an alkane dehydrogenation catalyst, which process comprises con- tacting a molecular sieve having a pore size not greater than that of a 5A type sieve in a liquid medium with a complexed platinum compound containing platinum group metal ions and an NH$_3$ radical as the complexing agent to effect an exchange of platinum group metal ions onto said sieve, drying said exchanged sieve, contacting the dried sieve with a reducing agent at an elevated tem- perature, and thereafter repeating the first-mentioned contacting step and the drying and reducing steps at least one more time to produce the desired catalyst.

4. Process according to claim 3 where the exchang- ing drying and reducing steps are carried out three or more times.

5. Process according to claim 3 where the catalyst is exchanged with alkali or alkaline earth metal ions after the final reduction step.

6. Process according to claim 3 where the molecular sieve is a 3A or 4A type sieve.

7. Process according to claim 3 where the platinum group metal is platinum.

8. Process according to claim 3 where the complexing agent is an amine.

9. Process according to claim 3 where the complex- ing agent is ammonia.

10. A process in accordance with claim 3 wherein the liquid medium is an aqueous solution.

11. A process in accordance with claim 3 wherein the sieve is moistened by passing air saturated with moisture over same before being contacted with the exchange ma- terial.

12. A process in accordance with claim 3 wherein the reducing agent is hydrogen.

References Cited

UNITED STATES PATENTS

| 3,140,252 | 7/1964 | Frilette et al. | 208—120 |
| 3,277,018 | 10/1966 | Plank et al. | 252—455X |
| 3,383,168 | 5/1968 | Kovach | 252—455X |
| 3,383,431 | 5/1968 | Fishel | 260—683.3 |
| 3,402,996 | 9/1968 | Maher et al. | 252—455X |
| 3,458,592 | 7/1969 | Senn et al. | 260—683.3 |

DANIEL E. WYMAN, Primary Examiner

C. F. DEES, Assistant Examiner

U.S. Cl. X.R.

23—112; 260—683.3